Sept. 10, 1968     E. F. JOHNSON     3,400,843
PHOTOGRAPHIC SLIDE STORAGE AND DISPENSING APPARATUS
Filed Aug. 15, 1967
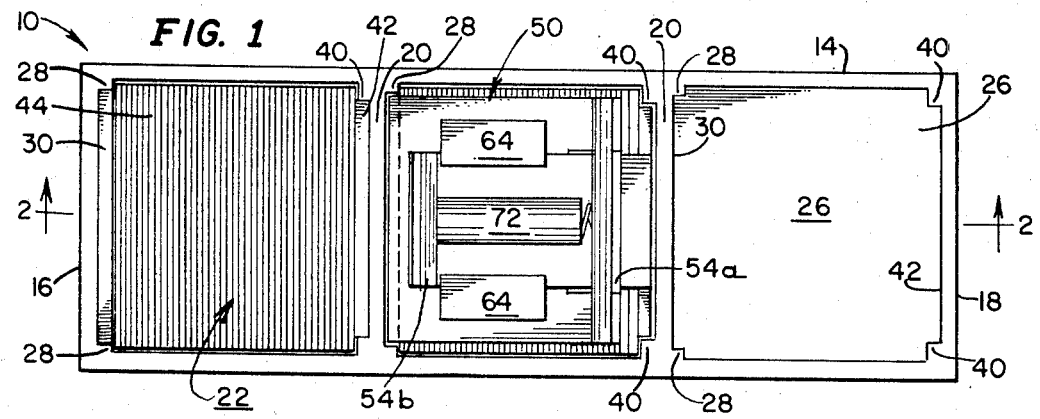
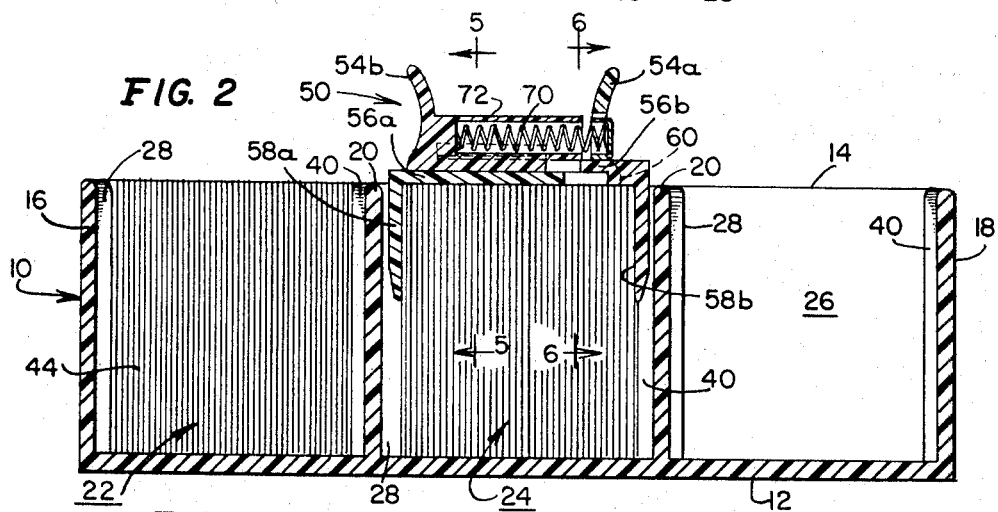
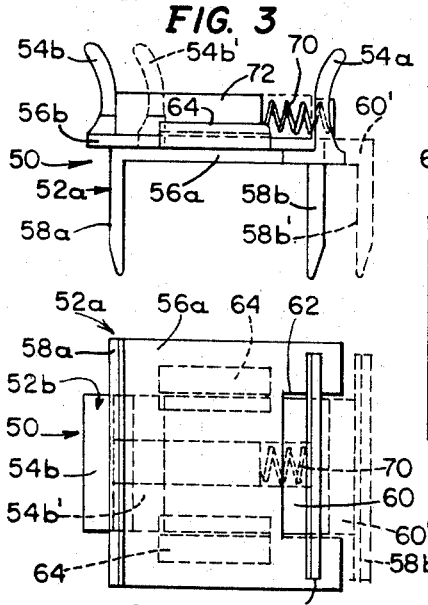
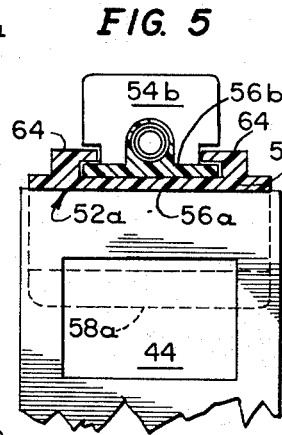
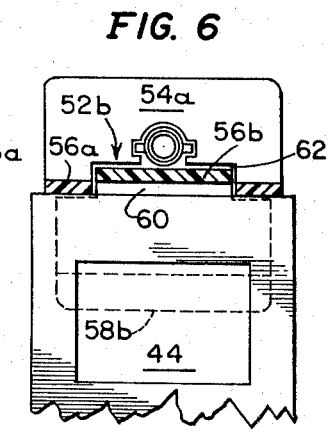
INVENTOR
Edward F. Johnson
BY
Hume, Clement, Hume & See
ATTYS.

United States Patent Office

3,400,843
Patented Sept. 10, 1968

---

3,400,843
PHOTOGRAPHIC SLIDE STORAGE AND DISPENSING APPARATUS
Edward F. Johnson, Rte. 1, Box 150,
Brule, Wis. 54820
Filed Aug. 15, 1967, Ser. No. 660,675
6 Claims. (Cl. 214—309)

ABSTRACT OF THE DISCLOSURE

A system for storing and dispensing photographic slides in a predetermined order includes a multicompartmented storage container and a slide gripping cartridge. The compartments in the container are box-shaped, adapted to hold stacks of slides, and include abutments along the inside, vertical edges. The abutments form three-sided, vertical slots along opposite ends of the compartments, which are of unequal width. A slide gripping cartridge, having gripping members of unequal width, is adapted to fit the slots and penetrate the compartments with only one directional orientation. The cartridge is a hand-operated, spring-loaded device, and includes means for maintaining proper directional orientation in the hand.

---

This invention relates to improvements in the storage and dispensation of photographic slides, and more specifically, to a storage container and dispensing device which maintains slides in a predetermined order.

Summary of the invention

Generally, the present invention includes a slide gripping cartridge and a container for storing slides. The gripping cartridge is hand-operated and grips a stack of slides to be transported to a projector or other viewing means. The cartridge and container cooperates to maintain the slides in a predetermined order, so that the stacks are not inadvertently reversed when being transferred to and from the projector while being handled with the gripping cartridge. To this end, the cartridge and container are designed so that the cartridge may be inserted into the container to grasp the slides in only one direction. The container preferably includes a plurality of similar box-shaped compartments, each being open at the top and sized to receive a stack of slides with each of the slides standing upright, that is, on an edge. The compartments include abutments along each vertical edge, forming three-sided slots at opposite ends of the compartment. The pair of abutments at one end of the compartment is relatively wider than the pair at the opposite end, so that the slot formed by the relatively narrow abutments is wider than the opposite slot. Neither slot is wide enough to receive the slides, so that four-sided slots are formed when slides are placed in the compartments. The slide gripping cartridge includes a pair of gripping legs of unequal width, the legs being sized to cooperate with the slots and to penetrate the compartment in only one direction.

Brief description of the drawings

The invention, both as to its organization and method of operation, will be best understood by reference to the following detailed description taken in connection with the accompanying drawings, in which:

FIGURE 1 is a top plan view of the apparatus of the present invention, including the storage container with the slide gripping cartridge inserted therein, FIGURE 2 is a cross-section view taken along line 2—2 of FIGURE 1;

FIGURE 3 is a side elevation of the slide gripping device of the present invention, illustrating said device in both compressed and released positions;

FIGURE 4 is a bottom plan view of the slide gripping device of FIGURE 3;

FIGURE 5 is a partial cross-section view of the cartridge and slides taken along line 5—5 of FIGURE 2; and FIGURE 6 is a partial cross-section view of the cartridge and slides taken along line 6—6 of FIGURE 2.

Description of the preferred embodiments

Referring to FIGURES 1 and 2, the present invention includes a multi-compartmented storage container 10 and a slide gripping cartridge 50. The gripping cartridge 50 is hand-operated, and grips a stack of slides 44 for transportation from the container 10 to a projecting or viewing apparatus (not shown). The cartridge 50 and container 10 are designed so that the cartridge 50 penetrates the compartments of the container 10 in only one direction, so that the slides cannot be inserted in the wrong direction. Referring more specifically to the apparatus shown in FIGURES 1 and 2, the invention includes a multi-compartmented container for storing a slide program, generally indicated by reference numeral 10. The container 10 has a bottom 12, sidewalls 14, a left end wall 16, and a right end wall 18. Spaced between the end walls 16, 18 are partitions 20 parallel to the end walls 16, 18 forming a series of compartments 22, 24, 26. At the inside juncture of the left end wall 16 and the sidewalls 14 are a pair of relatively narrow vertical abutments 28 forming a relatively wide slot 30. A similar pair of narrow vertical abutments 28 is positioned in the corresponding left end of the second and third compartments 24, 26 at the juncture of the sidewalls 14 and the partitions 20 also to form wide slots 30.

At the inside juncture of the sidewalls 14 and the right end wall 18 are a pair of relatively wide vertical abutments 40 forming a relatively narrow slot 42 which is narrower than the wide slot 30. Similar wide vertical abutments 40 are located at the right end of the first and second compartments 22, 24 at the juncture of the sidewalls 14 and the partitions 20 to form similar vertical, narrow slots 42. Each of the compartments 22, 24, 26 is of suitable dimensions to receive vertically a plurality of slides or of transparencies 44. As is clear from FIGURE 1, the slides 44 fit easily within the compartments, and are supported against the longitudinal movement by the abutments 28, 40 and against transverse movement by the sidewalls 14. The slides are supported on the bottom 12 of the container 10 as shown in FIGURE 2.

Identification means may be included on the exterior of the container 10. Examples include simple labels (not shown) on the exterior of one of the sidewalls 14 adjacent to each compartment 22, 24, 26. Optionally, raised letters or symbols (not shown) may be affixed to the exterior of the sidewalls 14 to make the contents of each compartment 22, 24, 26 identifiable in the dark.

In addition to the container 10, the storage and dispensing apparatus of the present invention includes a slide gripping cartridge generally indicated by reference numeral 50. In FIGURES 1 and 2 the preferred type of cartridge 50 is shown positioned over the slides 44 in the second compartment 24 and in gripping relation with the slides 44.

The detail of the cartridge 50 is best appreciated by reference simultaneously to FIGURES 3, 4, 5 and 6, showing various views. Generally, the cartridge is designed to grip slides 44, and is manually actuable to release them by gravity into either the storage container 10 or a suitable projecting or viewing device (not shown). The slide cartridge 50 comprises a first step-shaped frame member 52a and a second step-shaped frame member 52b. Each frame member 52a, 52b comprises a contoured finger gripping leg 54a, 54b, an intermediate leg 56a, 56b, and a slide gripping leg 58a, 58b. The second intermediate leg 56b is narrower than the first intermediate leg 56a, and includes a step-shaped abutment 60 at the juncture of the intermediate leg 56b and the slide gripping leg 58b.

The first frame member 52a has an aperture 62 formed by an opening intermediate the vertical edges of the finger gripping leg 54a and the intermediate leg 56a. This aperture 62 accommodates the intermediate leg 56b of the second frame member 52b and the abutment 60, such that the intermediate legs 56a, 56b are overlapped and the resultant cartridge 50 will have a generally H-shaped side configuration. The abutment 60 is of a height sufficient to form a level surface with the bottom of the intermediate leg 56a of the first frame member 52a. The abutment 60 extends a sufficient distance along the bottom of the second intermediate leg 56b to prevent slides 44 from slipping into the space between the second slide gripping leg 58b and the first intermediate leg 56a when the slide gripping legs 58a, 58b are moved apart. The abutment 60 also serves to limit the travel of the slide gripping legs 58a, 58b toward one another by contacting the first intermediate leg 56a at the end of the aperture 62.

On top of the first intermediate leg 56a are a pair of guides 64 aligned with the second intermediate leg 56b and positioned to maintain the intermediate legs 56a, 56b in slidable, aligned relationship with one another. Attached between the finger gripping legs 54a, 54b is a spring 70 which biases the finger gripping legs 54a, 54b away from one another. The spring 70 is partially enclosed by a tubular spring housing 72 affixed to the top of the second intermediate leg 56b. It is essential that the spring housing 72 be short enough to allow sufficient compression of the spring 70 to operate the device. The housing 72 also provides an effective means of limiting the travel of the finger gripping legs 54a, 54b toward one another.

In the preferred embodiment, the finger gripping legs 54a, 54b are of unequal width. The second finger gripping leg 54b is narrower than the first finger gripping leg 54a. Furthermore, both finger gripping legs 54a, 54b are outwardly curved. This curvature enables the comfortable gripping with the fingers, while the variation in size permits the second finger gripping leg 54b to be conveniently gripped with the thumb, while the first finger gripping leg 54a is more conveniently gripped with the fingers. This permits easy orientation of the device, which is especially important in a darkened room such as might be used to project slides. Although not shown in the preferred embodiment, means other than unequal size of the finger gripping legs 54a, 54b may be employed to insure proper directional orientation in the hand. For example, one of the finger gripping legs can be rough, while the other is smooth, or one can be curved while the other is flat.

The slide gripping legs 58a, 58b must be of unequal width. As may be seen from a comparison of FIGURE 5 and FIGURE 6, the first slide gripping leg 58a is wider than the second slide gripping leg 58b. The slide gripping legs 58a, 58b are of widths such that the wider first slide gripping leg 58a will not penetrate the narrower slot 42 of the container 10. It is thus possible to insert the slide gripping cartridge 50 into the container 10 only with the wider first slide gripping leg 58a facing toward the left, since it will not penetrate the narrow slot 42. The second slide gripping leg 58b, on the other hand, is narrow enough to penetrate the narrower slot 42. The slide gripping cartridge 50 may therefore penetrate the container 10 to grasp the slides 44 in only one direction.

In operation, the slides 44 are arranged in the order that they are to be viewed, and oriented in the proper direction for use in a slide projector. The slides 44, thus arranged and oriented, are broken down into consecutive groups and inserted into the first, second, and third compartments 22, 24, 26 of the slide container 10. Each of the compartments 22, 24, 26 is then labeled on one of the sidewalls 14 as to its contents. When the time arrives for projection of the slides, the slide gripping device 50 is grasped with the thumb on the second finger gripping legs 54b and the fingers on the first finger gripping leg 54a. The finger gripping legs 54a, 54b are then moved toward one another against the force of the spring 70. This is best appreciated by reference to FIGURES 3 and 4, showing the displacement of the second finger gripping leg 54b to the position designated 54b'. Movement of the finger gripping legs simultaneously causes movement of the intermediate legs 56a, 56b relative to one another, causing the slide gripping legs 58a, 58b to be moved apart. Such displacement of the slide gripping legs is indicated in FIGURES 3 and 4, where it is seen that the second slide gripping leg 58b has been displaced to a position designated 58b'.

When the finger gripping legs have been moved a distance sufficient to permit the grasping of the slides 44 maintained in the first compartment 22, the device is inserted into the slots 30, 42, with the wider first slide gripping leg 58a penetrating the wider slot 30, and the narrower second slide gripping leg 58b penetrating the narrower slot 42. Once the cartridge has been inserted fully into the slide container 10, pressure on the finger gripping legs 54a, 54b is released causing the slide gripping legs 58a, 58b to grasp the stack of slides 44. The slide gripping cartridge 50 along with the slides 44 is then removed from the first compartment 22 and transferred to a slide projector or suitable viewing device (not shown).

Once the slides 44 from the first compartment 22 have been viewed, they are again picked up with the slide gripping cartridge 50, the gripping procedure being performed as hereinbefore described, care being exercised to maintain the thumb on the narrower second finger gripping leg 54b in order to pick up the slides in the same direction as before. The cartridge 50, along with the slides 44, is reinserted into the first compartment, again with the wider first slide gripping leg 58a being able to penetrate only the wider slot 30 at the left end of the first compartment 22. Because this is the only way that the cartridge can be inserted into the container, the proper orientation is easily determined in a darkened room. To continue projection of the slides 44, the finger gripping legs 54a, 54b are again grasped to release the slides 44, and the cartridge 50 is removed from the first compartment 42. Immediately, the cartridge is inserted into the second compartment 24, where it may again penetrate in only one direction parallel to the slides, and the aforementioned operation is repeated. This operation is again repeated for the third compartment 26. It is thus seen that all of the slides 44 contained in the multi-compartmented slide container 10 are projected and redeposited into the container 10 without changing the order thereof. It is further possible to conveniently handle the slides using only the cartridge 50, handling of the slides with the fingers, which may damage or smudge them, being rendered unnecessary.

While the preferred embodiments described herein are at present considered to be preferred, it will be understood that various modifications and improvements may be made therein and it is intended to cover in the appended claims all such modifications and improvements as fall within the true spirit and scope of the invention.

I claim:

1. Apparatus for storing and dispensing a plurality of photographic slides in a predetermined order comprising: a photographic slide gripping cartridge including a pair of parallel gripping legs of unequal width, said gripping legs adapted to grip a plurality of slides; and a container having box-shaped compartments, said compartments being open at the top and adapted to store slides in an upright position, and said compartments each having an abutment along each vertical edge thereof, said abtuments forming a first and a second slot at opposite ends of said compartments, said first slot sized to receive the wider of said gripping legs, and said second slot sized to receive only the narrower of said gripping legs, both of said slots being too narrow to receive said slides, whereby said gripping legs may enter said compartment parallel to said slides in only one direction.

2. The apparatus described in claim 1 wherein said box-shaped compartments are linearly arranged end to end, to permit storage of said slides in a plurality of compartments in a single row.

3. The apparatus described in claim 1 wherein said compartments include identification means on the exterior thereof.

4. The apparatus described in claim 1 wherein said slide gripping cartridge comprises a first and second generally step-shaped frame member, each having a finger gripping leg, an intermediate leg, and a slide gripping leg, said first frame member suitably apertured to accommodate said intermediate leg of said second frame member which is slidably superimposed over said intermediate leg of said first frame member so that said frame members have a generally H-shaped side configuration; guide means affixed to said intermediate leg of said first frame member adapted to maintain said intermediate legs of said frame members in slidably superimposed relation; biasing means between said finger gripping legs biasing said finger gripping legs away from one another, whereby to bias said slide gripping legs toward one another.

5. The apparatus described in claim 4 wherein said slide gripping cartridge further includes an abutment secured to the underside of the intermediate leg of said second frame member, said abutment being located adjacent to said slide gripping leg of said second frame member and sized to penetrate said aperture in said first frame member, whereby to limit the travel of said slide gripping legs toward one another when said finger gripping legs are biased by said spring.

6. The apparatus described in claim 1 wherein said slide gripping means comprises a first and second generally step-shaped frame member, each having a finger gripping leg, an intermediate leg, and a slide gripping leg engageable with said slides when confined within said cartridge, said first frame member being apertured to receive said intermediate leg of said second frame member so that said intermediate leg of said second frame member is slidably superimposed over said intermediate leg of said first frame member so that said frame members have a generally H-shaped side configuration; an abutment secured to the underside of said intermediate leg of said second frame member adjacent to said slide gripping leg of said second frame member, said abutment fitted to penetrate said aperture; a pair of guides secured to said intermediate leg of said first frame member, said guides defining a passage for receiving said intermediate leg of said second frame member so that said intermediate legs of said frame members are maintained in slidably superimposed relation; and biasing means between finger gripping legs biasing said finger gripping legs away from one another, whereby to bias said slide gripping legs toward one another and to exert a gripping force on said slides.

References Cited

UNITED STATES PATENTS 2,698,756   1/1955   Eagle _____ 294—87

FOREIGN PATENTS 782,250   9/1957   Great Britain.

GERALD M. FORLENZA, *Primary Examiner.*

G. F. ABRAHAM, *Assistant Examiner.*